United States Patent [19]

Steckler et al.

[11] Patent Number: 4,635,103

[45] Date of Patent: Jan. 6, 1987

[54] PHASE LOCKED LOOP SYSTEM INCORPORATING AUTOMATIC GAIN CONTROL

[75] Inventors: Steven A. Steckler, Clark; Alvin R. Balaban, Lebanon, both of N.J.

[73] Assignee: RCA Corporation, Princeton, N.J.

[21] Appl. No.: 677,379

[22] Filed: Dec. 3, 1984

[51] Int. Cl.[4] .............................................. H04N 9/68
[52] U.S. Cl. ..................................................... 358/27
[58] Field of Search ....................... 358/13, 19, 25, 27, 358/28; 375/119

[56] References Cited

U.S. PATENT DOCUMENTS

| | | | |
|---|---|---|---|
| 4,130,831 | 12/1978 | Isono et al. | 358/21 V |
| 4,170,023 | 10/1979 | Yamakoshi et al. | 358/19 |
| 4,523,223 | 6/1985 | Luder et al. | 358/27 |
| 4,527,145 | 7/1985 | Haussmann et al. | 358/19 |
| 4,539,583 | 9/1985 | Flamm et al. | 358/27 |
| 4,556,900 | 12/1985 | Willis | 358/27 |

OTHER PUBLICATIONS

T. Fischer, "Digital VLSI Breeds Next-Generation TV Receivers", Electronics, Aug. 11, 1981, pp. 97–103.

Primary Examiner—John W. Shepperd
Attorney, Agent, or Firm—E. M. Whitacre; P. J. Rasmussen; K. N. Nigon

[57] ABSTRACT

An automatic gain control (AGC) circuit is described in the context of a phase locking system in a digital television receiver. The signal produced by the phase locking system is used to develop a sampling clock signal that is locked in frequency and phase to the color reference burst signal component of a color television signal. An AGC detector develops a gain control signal by averaging only those samples which would correspond to the peaks of the burst signal if the sampling clock signal were locked to the burst signal. The gain control signal is applied to a multiplier which increases or decreases the magnitude of the television signal samples to bring the calculated peak amplitude value of the burst signal within a predetermined range. The AGC circuitry interacts with the phase locking system to decrease the lock-up time when there is a relatively large difference in phase between the burst signal and the sampling clock signal.

11 Claims, 2 Drawing Figures

PHASE LOCKED LOOP SYSTEM INCORPORATING AUTOMATIC GAIN CONTROL

This invention relates to automatic gain control (AGC) circuitry suitable for use in a phase locked loop system.

A phase locked loop (PLL) is used in a signal processing system to generate an oscillatory signal related in frequency and phase to a reference signal. A PLL which incorporates automatic gain control circuitry is useful in signal processing systems, such as digital television receivers. In such a system, it is desirable to maintain an accurate phase lock with the reference signal across a sharp transition in the phase or amplitude of the reference signal.

Generally, a PLL includes a voltage controlled oscillator (VCO), a phase detector and a loop filter.

The VCO may be an oscillator which produces a signal, the frequency and phase of which may be changed responsive to a control signal. This control signal is developed by the phase detector and the loop filter.

The phase detector compares the signal provided by the VCO to the reference signal and generates a signal that is proportional to the difference in phase between the two signals. Since the two signals may include undesirable noise components and may have different frequencies, the phase detector preferably averages the value of the phase difference between the two signals over several cycles.

The loop filter may be a low-pass filter which integrates the signal provided by the phase detector. The signal developed by the loop filter is applied to the control input terminal of the VCO.

Any difference in frequency or phase between the reference signal and the signal provided by the VCO results in a non-zero phase-error signal from the phase detector. The phase-error signals are applied to the filter to increase or decrease the level of the signal applied to control the VCO. When the frequency and phase of the signal provided by the VCO correspond to the reference signal, the phase detector provides a zero-valued output signal and the signal produced by the loop filter does not change. Consequently, the frequency of the signal provided by the VCO remains constant.

In a sampled data signal processing system, the signal provided by the PLL may be used to develop the clock signal which determines the rate and phase at which the reference signal is sampled. To satisfy the Nyquist criteria, the rate of the sampling clock signal may be a multiple of the frequency of the reference signal. If the frequency of the sampling clock signal is chosen to be four times the frequency of the reference signal, a simplified phase detector may be used.

When the sampling clock and the reference signal are so related, samples provided to the phase detector may be represented by the sequence: A sine $\theta$, A cosine $\theta$, $-$A sine $\theta$, $-$A cosine $\theta$, A sine $\theta$, etc., where A is a function of the peak amplitude of the reference signal and $\theta$ approximates the phase angle which separates the reference signal from the signal that would be obtained by frequency dividing the sampling clock signal by four.

One type of phase detector averages the A sine $\theta$ samples to produce a phase-error signal. When the loop is locked, these samples correspond to zero-crossing points of the reference signal. Accordingly, this type of phase detector is commonly referred to as a zero-crossing detector. The magnitude of the phase-error signal provided by a zero-crossing detector is a function of the amplitude of the reference signal as well as of the phase difference between the reference signal and the sampling clock signal. Consequently, when the amplitude of the reference signal is relatively low, a longer time interval may be required to achieve a locked state than when the reference signal is at its nominal level. Therefore, where the amplitude of the reference signal may vary significantly, it may be desirable to include AGC circuitry either within or before the PLL to ensure that the amplitude of the reference signal processed by the phase detector is neither too large nor too small.

A particular example of such an AGC circuit is shown in published Japanese patent application No. 58-213595 entitled "Digital Integrated Chrominance Channel Circuit Having Gain Control". The circuit described in this application includes a particular form of AGC circuitry, within the automatic chrominance control (ACC) circuitry of a digital television signal processing system. The ACC circuitry adjusts the amplitude of the burst signal. The burst signal is applied as the reference signal to a PLL.

In the ACC circuitry, the absolute values of two consecutive samples are added to obtain a value proportional to the amplitude of the burst signal. This value is compared to a maximum value, stored in a register. If the new value is greater than the maximum value, it becomes the new maximum value and is stored in the register. The differences between the maximum values and a nominal maximum value are accrued in an accumulator to develop a signal which is applied to one input of a multiplier. The signal applied to the other input of the multiplier is the chrominance signal, including its burst signal component. For weak chrominance signals, the value applied to the multiplier increases, causing the multiplier to increase the magnitude of the burst signal until the maximum value of the burst signal equals the nominal maximum value. At this point the signal applied to the accumulator goes to zero and the factor applied to the multiplier does not change.

The ACC circuitry described above amplifies a weak burst signal sufficiently to shorten the lock-up time of a PLL which uses a zero-crossing detector, but it does not do the complete job. It would be desirable for the AGC circuitry used with a PLL to cause the loop to lock more quickly when there is a large difference in phase between the signal provided by the loop and the reference signal.

SUMMARY OF THE INVENTION

The present invention is an AGC circuit that is useful in a sampled data signal processing system. The system includes a PLL which generates a sampling clock signal that is synchronized to a reference signal. The AGC circuit includes an AGC detector which develops a gain control signal by processing only those samples that would correspond to the peaks of the reference signal if the PLL were locked. The gain control signal is applied to a sample scaler which changes the magnitude of each sample by an amount proportional to the amplitude of the control signal.

DETAILED DESCRIPTION

Figure 1:
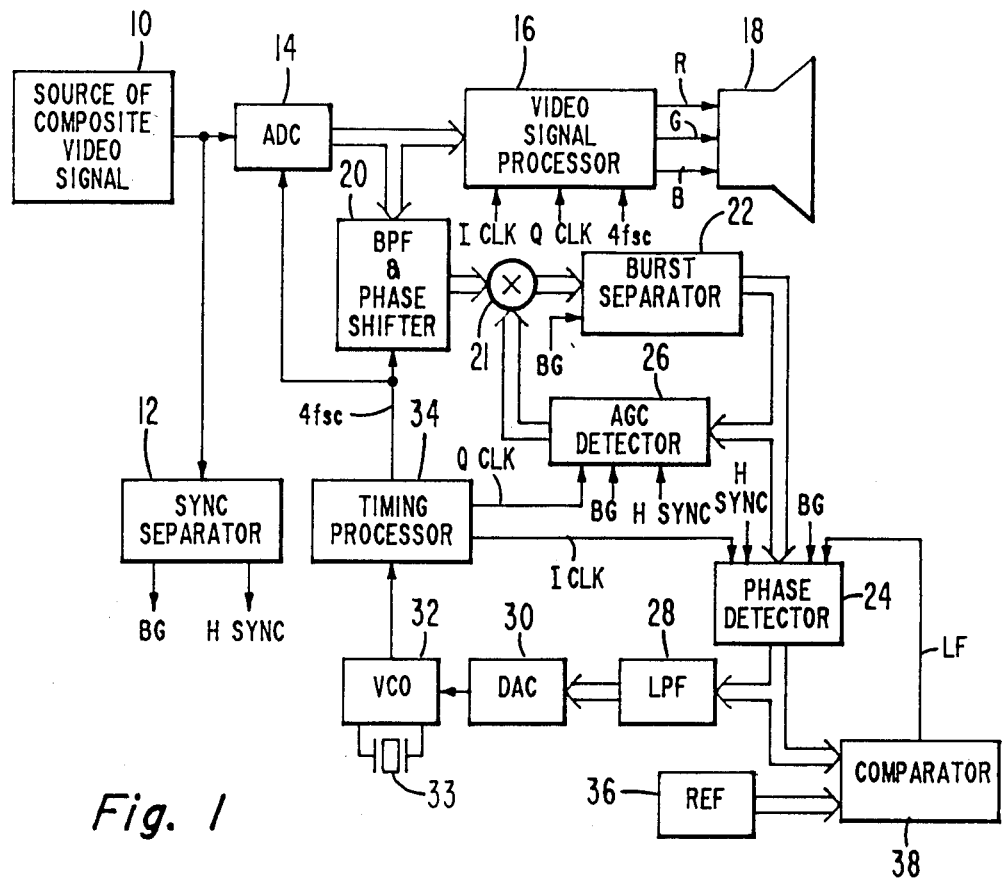
FIG. 1 is a block diagram of a phase locked loop system embodying the present invention in the environment of a digital television receiver.

In the drawings, broad arrows represent busses for multiple-bit parallel digital signals. Line arrows represent connections carrying analog signals or single bit digital signals. Depending on the processing speed of the devices, compensating delays may be required in certain of the signal paths. One skilled in the art of digital circuit design would know where such delays would be needed in a particular system.

In FIG. 1, a source of composite video signal 10, which may include the tuner, intermediate frequency amplifier and video detector of a conventional television receiver, applies base-band analog composite video signals to sync separator 12 and to analog to digital converter (ADC) 14. Sync separator 12 may be a conventional circuit which separates the horizontal synchronization pulses from an analog composite video signal and generates a burst gate signal, BG. The horizontal synchronization signal, H SYNC, provided by separator 12 is in a logic high state for the duration of each horizontal sync pulse and in a logic low state otherwise. The burst gate signal, BG, is in a logic high state during the burst interval of each horizontal line for four complete cycles of the burst signal and in a logic low state otherwise. These signals are used in the phase locked loop circuitry as explained below.

ADC 14, under control of a $4f_{sc}$ clock signal from timing processor 34, samples the analog composite video signal and produces digital samples representing the analog samples. ADC 14 may be a conventional flash ADC which provides, for example, seven-bit digital samples. These samples are applied to video signal processor 16. Processor 16 may, for example, separate the luminance components and the I and Q color difference signal components from the composite video samples, and process these components into primary color signals R, G and B which are applied to a display device 18. Video signal processor 16 is controlled by the clock signals $4f_{sc}$, I CLK and Q CLK. These signals are provided by timing processor 34, which is synchronized to the color burst reference component of the composite video signals by a phase-locked loop (PLL).

Composite video samples from ADC 14 are applied to band-pass filter and phase shifter 20. Band-pass filter and phase shifter 20 removes spurious high and low frequency noise components from the composite video samples and provides burst samples at its output port which are shifted in phase by 33° with respect to the burst samples applied to its input port.

Output samples from filter and phase shifter 20 are applied to multiplier 21. Multiplier 21 scales the filtered and phase shifted samples by a factor determined by automatic gain control (AGC) detector 26. AGC detector 26 and multiplier 21 maintain the peal amplitude of the burst signal within a predetermined range of values. AGC detector 26 is described below in reference to FIG. 4. The multiplier 21 may be a conventional eight-bit by eight-bit multiplier, however, a simplified shift-and-add multiplier may be used instead.

Multiplier 21 applies the scaled and filtered samples to burst separator 22. In the present embodiment, burst separator 22, under control of the burst gate signal, BG, from sync separator 12, extracts samples representing four cycles of the burst signal from each line of the filtered samples.

Filtered, phase shifted and scaled samples from burst separator 22 are applied to phase detector 24. Since the band-pass filter and phase shifter 20, used in this embodiment of the invention, shifts the phase of the NTSC burst signal by 33°, the zero-crossing points—which occurred at the R—Y phases of the unprocessed burst signal—occur at the I phases of the phase shifted burst signal.

Phase detector 24 averages the magnitude of I phase samples of the burst signal (i.e. those occurring coincident with the leading edges of the I CLK pulses) to produce a phase error signal. This phase error signal is used to lock the clock signals provided by timing processor 34 to the phase shifted burst signal. Consequently, timing processor 34 produces clock signals that are aligned with the I and Q phases of the unfiltered composite video signals.

The phase detector 24 provides phase error samples to low-pass filter 28 at the horizontal line rate. Low-pass filter 28, which may include an integrator develops a signal proportional to the accumulated sum of the phase error signals provided by phase detector 24. Filter 28 applies this signal to digital to analog converter (DAC) 30. DAC 30 changes the digital signal into an analog potential which is applied to VCO 32 to control the frequency of the signal provided by the VCO. VCO 32 may be a conventional voltage controlled oscillator which may have a free-running frequency that is determined by a piezoelectric crystal. Desirably, the resonant frequency of the crystal is close to $4f_{sc}$ (e.g. within 2 KHz of 14.31818 MHz for NTSC) to ensure that the PLL locks quickly and at the proper frequency.

VCO 32 applies a sinusoidal $4f_{sc}$ signal to timing processor 34. Processor 34 may include circuitry for generating a square wave $4f_{sc}$ clock signal from the sinusoidal input signal, and for generating the quadrature phase related I CLK and Q CLK signals, each at $2f_{sc}$. Details of processor 34 are not shown since it is not considered a part of the invention. Processor 34 may be built from conventional components by one skilled in the art.

Phase detector 24 applies accumulated zero-crossing samples to one input terminal of the comparator 38 which produces the signal LF. A reference source 36 provides a value to the second input of comparator 38. The value provided by source 36 represents the value produced by the phase detector when the PLL has achieved a coarse lock to the burst signal. The output signal of comparator 38, LF, is in a logic low state when the value applied by source 36 is less than the value provided by phase detector 24 and in a logic high state otherwise. Accordingly, LF is in a logic low state until the PLL has achieved a coarse lock and in a logic high state until the values provided by phase detector 24 indicate that the PLL is no longer synchronized to the burst signal.

The phase of the burst signal component of a composite video signal can change rapidly in response to changes in the source of broadcast signals. For example, a change between two programs may result in a change in the phase of the burst component of the composite video signal. Since the phase of the burst signal determines the hue of colors in the reproduced image, it is desirable for the PLL to be able to respond quickly to any change in the burst signal. To this end, the present PLL system includes an automatic gain control system comprising AGC detector 26 and multiplier 21. This AGC system maintains a desirable transient response characteristic for the PLL system.

AGC 26 develops a gain control signal from the samples which coincide with the Q clock signal. When the phase shifted samples that coincide with the I clock signal represent zero-crossing samples of the burst cycles, the samples that coincide with the Q clock represent the peaks of the burst cycles. AGC 26 averages these peak samples over one burst interval to produce a gain control signal which is applied to multiplier 21 to increase or decrease the magnitude of the filtered burst samples.

Figure 2:
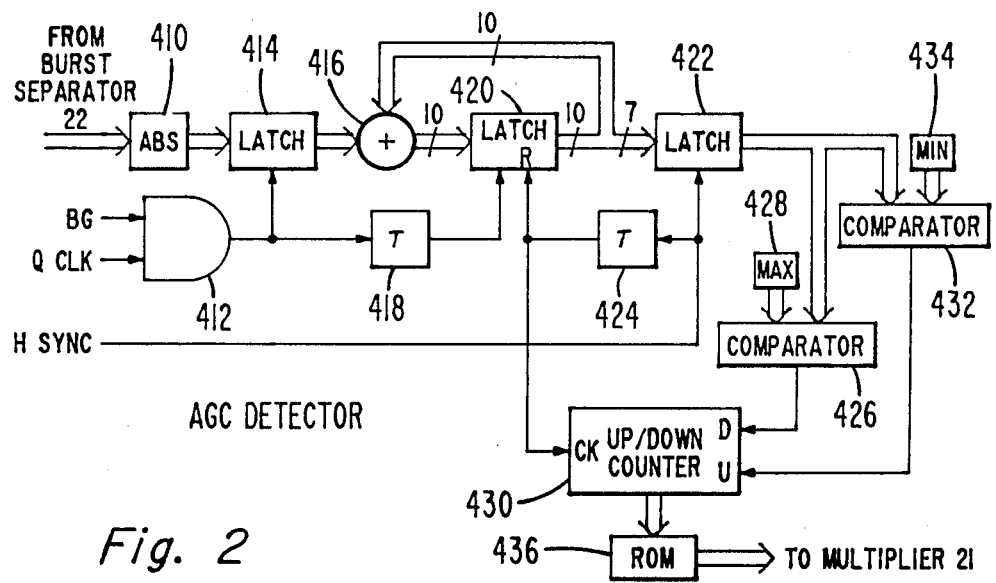
FIG. 2 is a block diagram of automatic gain control circuitry suitable for use in the embodiment shown in FIG. 1.

FIG. 2 is a block diagram of an AGC detector suitable for use in the present invention. Seven-bit samples of the phase shifted burst signal are applied to absolute value circuit 410. Circuit 410 changes the polarity of selected samples to apply single polarity samples to latch 414. Samples are stored in latch 414 coincident with the leading edges of the clock pulses applied to the latch by AND gate 412. The clock signal provided by gate 412 is the logical AND of the Q clock signal, Q CLK, and the burst gate signal, BG. When the PLL is locked, the codewords stored in latch 414 correspond to the peak samples of the phase shifted burst signal. These samples are applied to an accumulator which includes adder 416 and latch 420. Adder 416 sums the seven-bit samples provided by latch 414 with the accumulated 10 bit samples provided by latch 420. Ten-bit samples provided by adder 416 are stored in latch 420 coincident with the leading edges of the clock pulses provided to latch 420 by AND gate 412 via delay element 418. Delay element 418 provides compensating delay equal to the processing time through adder 416. The samples stored in latch 420 represent the accumulated sum of eight burst samples. To preserve sample accuracy and to prevent overflow errors, the samples are stored as ten-bit values. The seven most significant bits of accumulated samples are transferred from latch 420 to latch 422 on the leading edge of the H SYNC pulses applied to the clock input of latch 422. Since latch 422 contains the seven most significant bits of the ten-bit samples accumulated in latch 420, it contains the average magnitude of eight samples taken at the peak points in the waveform of the phase shifted burst signal.

Latch 422 provides these averaged samples to comparators 426 and 432. A reference value representing the maximum sample magnitude which may be processed by the PLL system (e.g. 22.3 IRE), is applied to a second input terminal of comparator 426 by source 428. Comparator 426 produces a logic high output signal when the samples provided by latch 422 are greater than or equal to the reference value from source 428. When the value from latch 422 is less than the reference value, comparator 426 produces a logic low signal. Comparator 426 applies this signal to the count-down input terminal, D, of UP/DOWN counter 430.

A reference value representing the minimum sample magnitude which may be processed by the PLL system (e.g. 16.5 IRE), is applied to a second input terminal of comparator 432 by source 434. Comparator 432 produces a logic high output signal when the samples provided by latch 422 are less than or equal to the reference value from source 434. When the value from latch 422 is greater than the reference value, comparator 432 produces a logic low signal. Comparator 432 applies this signal to the count-up input terminal, U, of UP/DOWN counter 430. The pulse signal H SYNC is applied to the clock input of counter 430 via delay element 424. Delayed H SYNC pulses from delay element 424 are also applied to the reset input terminal of latch 420. Delay element 424 provides compensating delay equal to the transfer time from latch 420 to latch 422 and for the processing delay incurred through comparators 426 and 432.

Counter 430 is shown as having separate count-up and count-down inputs to simplify the explanation of its operation. A counter of this sort can be made using conventional logic devices and conventional counters such as the 74191 synchronous UP/DOWN counter with mode control.

The value provided by counter 430 is incremented or decremented coincident with the leading edges of the pulses applied to the clock input of the counter. When the count-up signal is in a logic high state, the value provided by the counter increases by one with each horizontal sync pulse. Similarly, when the count-down signal is in a logic high state, each of the delayed H SYNC pulses cause the value provided by the counter to decrease by one.

Counter 430 applies this value as an address to read-only memory (ROM) 436. ROM 436 translates the count output values from counter 430 to appropriate gain factors to be applied to multiplier 21. Table I shows the correspondence between the counter values, the ROM addresses and the gain factors.

TABLE I

| Rom Address | Gain Factor |
| --- | --- |
| 0 | 1 |
| 1 | 1.125 |
| 2 | 1.265 |
| 3 | 1.424 |
| 4 | 1.602 |
| 5 | 1.802 |
| 6 | 2.027 |
| 7 | 2.281 |
| 8 | 2.566 |
| 9 | 2.886 |
| 10 | 3.247 |
| 11 | 3.653 |
| 12 | 4.110 |
| 13 | 4.624 |
| 14 | 5.202 |
| 15 | 5.852 |
| 16 | 6.583 |
| 17 | 7.406 |
| 18 | 8.330 |
| 19 | 9.373 |

It is noted that the gain factors increase by factors of 1.125 as the counter is incremented from zero.

To understand the operation of the AGC circuit, assume that the counter value is zero, the peak amplitude of the burst signal is 5 IRE, and that the values provided by reference value sources 428 and 434 are 22.3 IRE and 16.5 IRE respectively. To avoid confusion over the interaction between the AGC detector and the phase detector, assume that the peak samples of the burst signal occur coincident with the leading edges of the Q CLK pulses and, that the zero-crossing samples occur coincident with the leading edges of the I CLK pulses.

Since the value in the counter is zero, the initial gain factor is 1 and the burst amplitude sample applied to comparator 432 is 5 IRE. Since this value is less than the minimum reference value applied to the comparator by source 434, the comparator applies a logic high signal to the COUNT-UP input terminal of counter 430. The counter increments its value to one and the gain factor applied to multiplier 21 is 1.125. The gain factor increases in this manner over the next ten sequential burst periods to 3.653. When the gain factor is 3.653 the value of the burst peak sample applied to comparator 432 is 18.265 IRE. This is greater than the 16.5 IRE minimum value applied to the comparator 432 by source 434. Consequently, comparator 432 applies a logic low signal to counter 430. The value provided by counter 430 to ROM 436 is held at three and the gain factor applied to multiplier 21 is held at 3.653. It is noted that the initial value provided by the counter is unimportant as long as the burst signal is within −18 dB of its nominal 20 IRE peak amplitude. The counter will be incremented or decremented to a value which places the averaged burst amplitude within the range of values defined by the minimum and maximum reference values of sources 434 and 428 respectively.

The above example assumed a zero initial phase difference between the burst signal and the clock signals generated by the PLL. However, the AGC circuitry of the present embodiment works well when a non-zero phase difference exists, causing the PLL to lock more quickly than if there were no AGC circuitry in the loop.

When the peaks of the phase shifted burst signal do not occur coincident with the Q clock pulses, the averaged peak value developed by AGC detector 26 may be less than the actual peak value of the burst. Moreover, for phase errors greater than 45°, the average value of the Q burst samples may be less than the average value of the I samples. In these instances, AGC detector 26 may apply a gain factor to multiplier 21 that is larger than would be applied if detector 26 averaged the actual peak values of the burst signal. Multiplier 21 scales all of the burst samples by this gain factor, including the I samples which are averaged by the phase detector 24 to develop the phase error signal. When the magnitude of the I samples is increased, the amplitude of the phase error signal provided by phase detector 24 is increased, causing the frequency of signal provided by the VCO to change more quickly than if the magnitude of the I samples had not been increased. As the frequency of the signal provided by the VCO approaches a harmonic of the burst frequency, the value of the Q samples approach the peak value of the burst signal, and the gain factor developed by AGC detector 26 decreases, approaching its proper value. As the gain factor decreases and the PLL approaches a locked state, the magnitude of the I samples and the phase error signal developed from them decreases, slowing the rate at which the frequency of the signal provided by the VCO changes.

The rate at which the frequency of the signal provided by the VCO changes is proportional to the average value of the phase error between the individual cycles of the signal provided by the VCO and the burst signal. Consequently, the rate at which the loop approaches a locked state is generally higher than for a PLL without AGC circuitry or for a PLL having an AGC which determines the gain factor based on the values of both the zero-crossing and peak samples.

What is claimed is:

1. In a sampled data signal processing system including a source of reference signal having a predetermined frequency and phase and a phase locked loop having first and second operational modes for developing a sampling clock signal having an indeterminate phase relationship with said reference signal in said first operational mode and having a predetermined phase relationship with said reference signal in said second operational mode, automatic gain control apparatus comprising:

first means coupled to said source and to said phase locked loop and responsive to said clock signal for developing first and second alternatingly interleaved sequences of samples representing said reference signal;

second means responsive to said first sequence of samples to the substantial exclusion of said second sequence of samples for developing a signal representing the average magnitude of said first sequence of samples; and third means, coupled between said first means and said phase locked loop and responsive to the magnitude signal provided by said second means, for changing the magnitudes of said first and second sequences of samples by amounts inversely proportional to said average magnitude signal to develop a signal for application to said phase locked loop.

2. The automatic gain control apparatus set forth in claim 1 wherein:

said first means comprises an analog-to-digital converter for providing said first and second sequences of digital samples representing said reference signal; and said second means comprises an accumulator coupled to said analog-to-digital converter for summing a predetermined number of samples from said first sequence of samples to provide a signal representing the magnitude of said first sequence of samples.

3. The automatic gain control apparatus set forth in claim 2 wherein said third means comprises:

means for comparing the signal provided by said second means to first and second predetermined reference values and for providing a signal that is in a first state when said signal provided by said second means is less than said reference value, that is in a second state when the signal provided by said second means is greater than said second reference value and that is in a third state otherwise; and means coupled to said comparing means for providing a signal which increases in amplitude when the signal provided by said comparing means is in said first state and which decreases in amplitude when the signal provided by said comparing means is in said second state.

4. In a sampled data signal processing system including a source of reference signal having a predetermined frequency and a predetermined phase, a phase-locked loop coupled to said source and responsive to said reference signal for providing a sampling clock signal and means coupled to said source and to said phase-locked loop for providing first samples having values substantially equal to A sine $\theta$ alternatingly interleaved with second samples having values substantially equal to A cosine $\theta$, A being a real number proportional to the amplitude of said reference signal and $\theta$ being an angle proportional to the instantaneous difference in phase between said reference signal and said sampling clock signal, automatic gain control apparatus comprising:

first means coupled to said sample providing means and responsive to said first samples to the substantial exclusion of said second samples for providing a signal representing the magnitude of said first samples;

second means coupled to said first means for developing a gain control signal that is inversely proportional to said signal provided by said first means; and sample scaling means coupled to said second means and coupled between said sample providing means and said first means for changing the magnitudes of the samples provided by said sample providing means by amounts proportional to said gain control signal.

5. The automatic gain control apparatus set forth in claim 4 wherein the first and second samples provided by said sample providing means are digital samples and said first means comprises an accumulator for summing a predetermined number of said first samples to provide a signal representing the peak magnitude of said first samples.

6. The automatic gain control apparatus set forth in claim 5 wherein said second means comprises:

means for comparing the signal provided by said first means to first and second predetermined reference values and for providing a signal that is in a first state when the signal provided by said first means is less than said first reference value, that is in a second state when the signal provided by said first means is greater than said second reference value and that is in a third state otherwise; and means coupled to said comparing means for providing a signal which increases in amplitude when the signal provided by said comparing means is in said first state and decreases in amplitude when the signal provided by said comparing means is in said second state.

7. The automatic gain control apparatus set forth in claim 6 wherein said gain factor developing means includes:

a counter which increments a value at a predetermined rate when the signal provided by said comparing means is in said first state and decrements said value at said predetermined rate when the signal provided by said comparing means in in said second state; and a read-only memory having an address port coupled to said counter and programmed to provide values proportional to the values provided by said counter at an output port.

8. In a video signal processing system including a source of composite video signal having a chrominance signal component which includes first and second quadrature phase related color difference signal components and a color reference burst signal component having a predetermined frequency and phase, a phase locked loop responsive to said burst signal and having first and second operational modes for developing a sampling clock signal having an indeterminate phase relationship with said color reference burst signal in said first operational mode and having a predetermined phase relationship with said color reference burst signal in said second operational mode, and means coupled to said source and to said phase-locked loop for providing samples which, when said phase locked loop is in said second operational mode, represent said first color difference signal component to the substantial exclusion of said second color difference signal component, automatic gain control apparatus comprising:

first means coupled to said sample providing means and responsive to the samples representing said color reference burst signal provided thereby for developing a signal representing the magnitude of said samples;

second means coupled to said first means for generating a gain control signal that is inversely proportional to the signal provided by said first means; and sample scaling means coupled to said second means and coupled between said sample providing means and said phase locked loop for changing the magnitudes of the samples provided by said sample providing means by amounts proportional to said gain control signal.

9. The automatic gain control apparatus set forth in claim 8 wherein the samples provided by said sample providing means are digital samples and said first means comprises an accumulator for summing a predetermined number of said digital samples to provide a signal representing the average magnitude of said digital samples.

10. The automatic gain control apparatus set forth in claim 8 wherein said second means comprises:

means for comparing the signal provided by said first means to first and second predetermined reference values and for providing a signal that is in a first state when the signal provided by said first means is less than said first reference value, that is in a second state when the signal provided by said first means is greater than said second reference value and that is in a third state otherwise; and means coupled to said comparing means for providing a gain control signal which increases in amplitude when the signal provided by said comparing means is in said first state and decreases in amplitude when the signal provided by said comparing means is in said second state.

11. A sampled data signal processing system including a signal phase locking system comprising:

an input terminal for applying a reference signal having a predetermined frequency and phase;

sampling means coupled to said input terminal and responsive to a sampling clock signal for developing first and second alternatingly interleaved sequences of samples representing said reference signal;

scaling means coupled to said sampling means and responsive to a control signal for scaling the samples provided by said sampling means by amounts proportional to said control signal;

phase locked loop circuitry coupled to said scaling means and responsive to the samples provided thereby for developing said sampling clock signal, wherein said phase locked loop has a first operational mode in which said sampling clock signal has an indeterminate phase relationship with said reference signal and a second operational mode in said sampling clock signal is locked in phase to said reference signal; and means coupled to said sampling means and responsive to said first sequence of samples to the substantial exclusion of said second sequence of samples for developing the control signal for said scaling means, said control signal being inversely proportional to the magnitude of the samples of said first sequence.

* * * * *